(12) United States Patent
Hong et al.

(10) Patent No.: US 10,241,596 B2
(45) Date of Patent: Mar. 26, 2019

(54) TOUCH KEYPAD

(71) Applicants: WOORI ENGINEERING CO., LTD., Siheung-si, Gyeonggi-do (KR); LENTUS, Gunpo-si, Gyeonggi-do (KR)

(72) Inventors: Seung Min Hong, Yongin-si (KR); Hyun Dong Jin, Gwangmyeong-si (KR)

(73) Assignees: WOORI ENGINEERING CO., LTD., Siheung-si, Gyeonggi-do (KR); LENTUS, Gunpo-si, Gyeonggi-do (KR)

( * ) Notice: Subject to any disclaimer, the term of this patent is extended or adjusted under 35 U.S.C. 154(b) by 137 days.

(21) Appl. No.: 15/317,979

(22) PCT Filed: Jun. 5, 2015

(86) PCT No.: PCT/KR2015/005642
§ 371 (c)(1),
(2) Date: Dec. 12, 2016

(87) PCT Pub. No.: WO2015/190756
PCT Pub. Date: Dec. 17, 2015

(65) Prior Publication Data
US 2017/0139493 A1    May 18, 2017

(30) Foreign Application Priority Data

Jun. 13, 2014 (KR) .................. 10-2014-0072243
Jun. 4, 2015 (KR) .................. 10-2015-0079209

(51) Int. Cl.
*G06F 1/16* (2006.01)
*G06F 3/02* (2006.01)
(Continued)

(52) U.S. Cl.
CPC .......... *G06F 3/03547* (2013.01); *G06F 1/169* (2013.01); *G06F 3/0202* (2013.01);
(Continued)

(58) Field of Classification Search
None
See application file for complete search history.

(56) References Cited

U.S. PATENT DOCUMENTS

2009/0189789 A1    7/2009  Oh
2013/0083558 A1*   4/2013  Becze .............. G06F 3/1438
                                                 362/611

FOREIGN PATENT DOCUMENTS

JP    2009-286237 A    12/2009
KR    10-2004-0081697 A    9/2004
(Continued)

OTHER PUBLICATIONS

International Search Report for PCT/KR2015/005642 dated Jul. 9, 2015 from Korean Intellectual Property Office.

*Primary Examiner* — Stephen T. Reed
(74) *Attorney, Agent, or Firm* — Revolution IP, PLLC

(57) ABSTRACT

Disclosed is a touch keypad comprising: an upper plate having a flat plate shape; a touch sensor formed on an upper side of the upper plate; a lower plate disposed to be spaced on a lower side of the upper plate; a connection member connecting the upper plate to the lower plate and supporting the upper plate so that the upper plate ascends and descends; a position sensor for detecting whether the upper plate ascends or descends; and a control unit for selecting a keypad mode or mouse mode according to a detected value of the position sensor.

7 Claims, 3 Drawing Sheets

(51) Int. Cl.
  *G06F 3/023* (2006.01)
  *G06F 3/038* (2013.01)
  *G06F 3/041* (2006.01)
  *G06F 3/0354* (2013.01)
  *G06F 3/0488* (2013.01)

(52) U.S. Cl.
  CPC ............ *G06F 3/023* (2013.01); *G06F 3/0383* (2013.01); *G06F 3/0416* (2013.01); *G06F 3/04886* (2013.01)

(56) References Cited

FOREIGN PATENT DOCUMENTS

| | | |
|---|---|---|
| KR | 10-2005-0047329 A | 5/2005 |
| KR | 10-2006-0010579 A | 2/2006 |
| KR | 10-2008-0010266 A | 1/2008 |

\* cited by examiner

[FIG. 1]
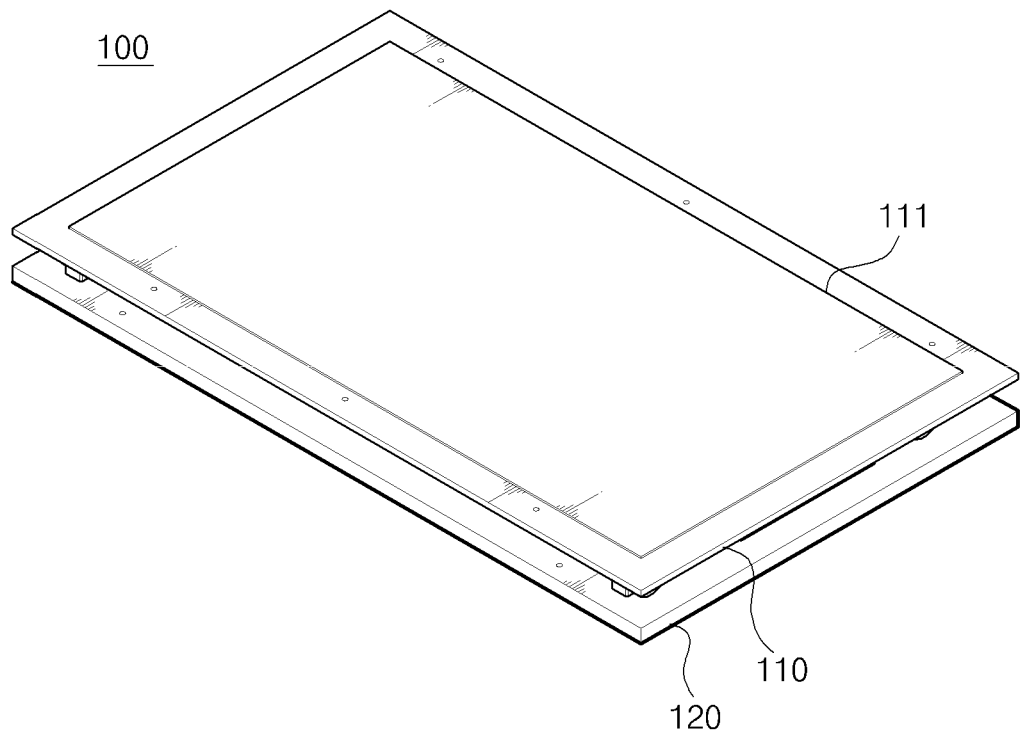
[FIG. 2]
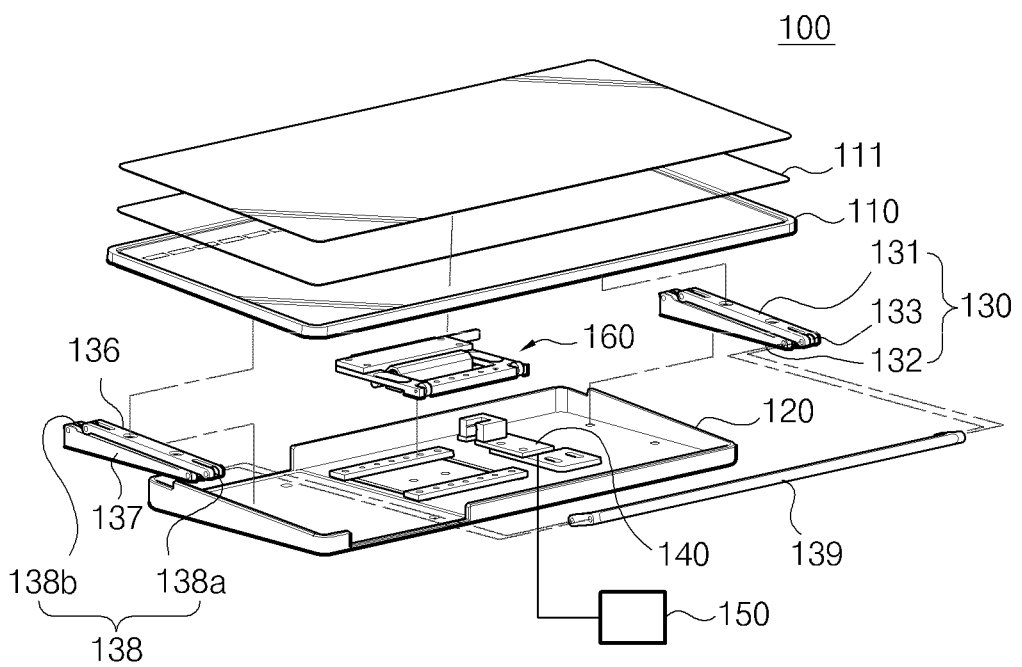

[FIG. 3]
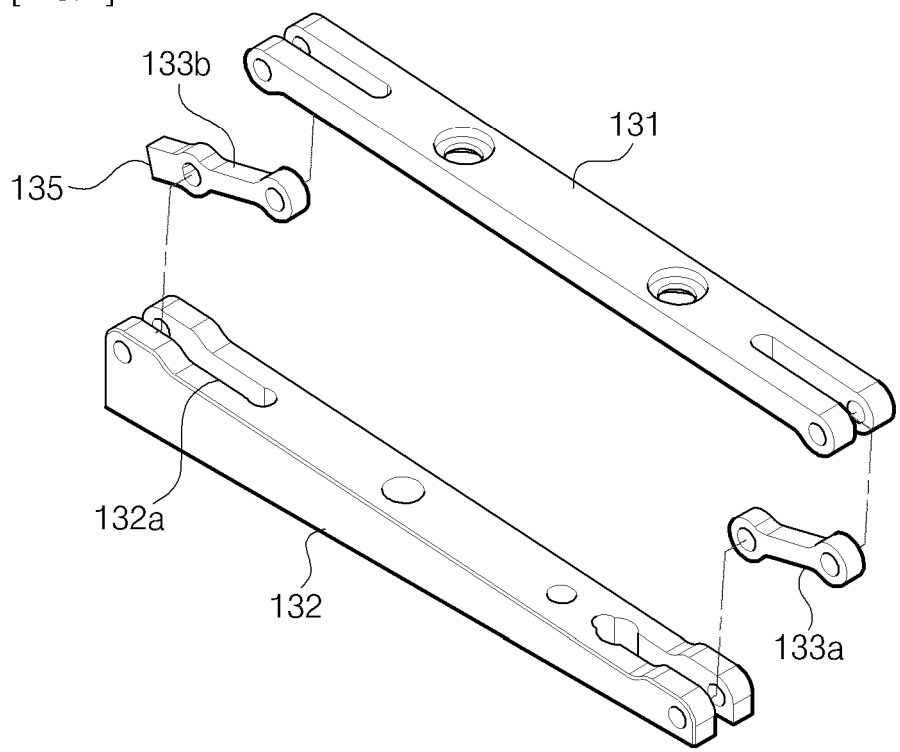
[FIG. 4]
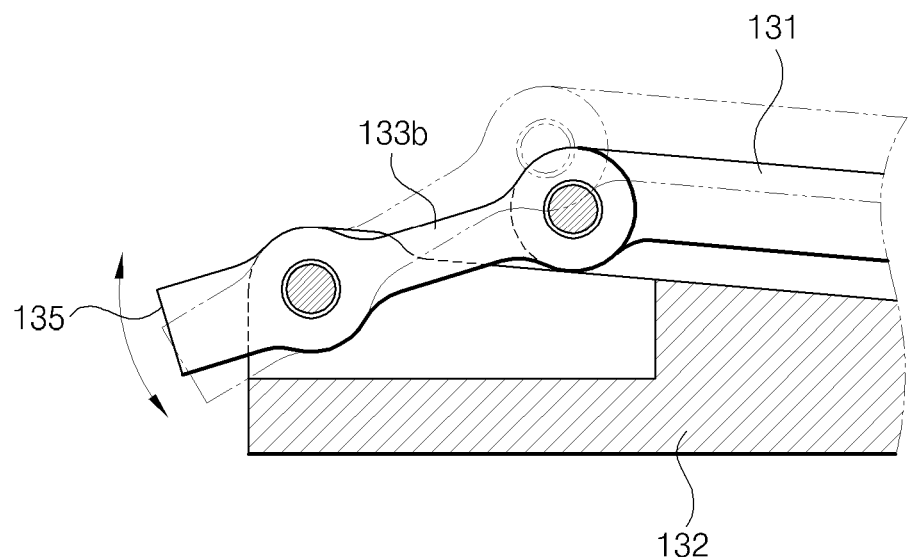

[FIG. 5]
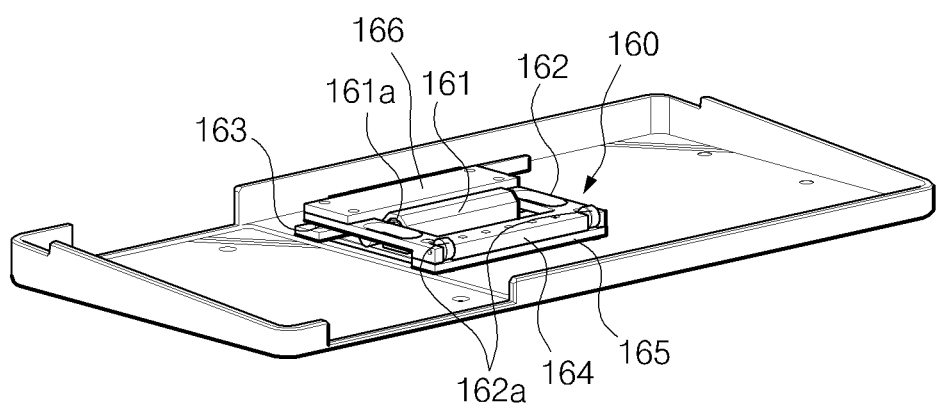

TOUCH KEYPAD

CROSS REFERENCE TO PRIOR APPLICATIONS

This application is a National Stage Application of PCT International Patent Application No. PCT/KR2015/005642 filed on Jun. 5, 2015, under 35 U.S.C. § 371, which claims priority to Korean Patent Application Nos. 10-2014-0072243 filed on Jun. 13, 2014, and 10-2015-0079209 filed on Jun. 4, 2015, which are all hereby incorporated by reference in their entirety.

TECHNICAL FIELD

The present invention relates to a touch keypad, and more particularly, to a touch keypad that may use mouse and keypad functions selectively as a mouse or a keypad mode is converted according to a user's pressing strength.

BACKGROUND ART

Referring to Korean Patent Laid-open Publication No. 10-2005-0047329, currently, a technique for a computing device has been repeatedly developed from a desk top personal computer (PC) to a laptop computer, a portable computing device, and a wearable computing device.

These computing devices have been developed as devices that can be easily used anytime and anywhere, because a user's movement is not limited. Accordingly, the need for a new input unit having the user's convenience, portability and efficiency is on the rise.

There is a keyboard mounted together with the computing device or a key panel type for a portable terminal device as a more-developed shape of a currently-proposed input unit based on an existing keyboard and an existing mouse input device.

Recently, due to an increase in the utilization of a personal information terminal device, such as a personal digital assistant (PDA), a pen input, a virtual keyboard, a touch screen, and a detachable keyboard have been widely used. Furthermore, glove input, a virtual finger keyboard, a head mouse, an eyeball mouse, a brainwave mouse have been also proposed.

However, the above-described input units according to the related art have advantages and disadvantages in particular factors. However, there is a difficulty in satisfying both keyboard and mouse functions using an efficient input unit for a next-generation computing device.

An information input device using finger's movement disclosed in Korean Patent Laid-open Publication No. 10-2005-0047329 developed to solve this problem has both keyboard and mouse functions. However, a keyboard or mouse mode is selected and converted based on movement at a fingertips' arbitrary contact surface. Thus, a mode different from the user's intention is determined such that input is performed differently from the user's intention.

DETAILED DESCRIPTION OF THE INVENTION

Technical Problem

The present invention provides a touch keypad having keypad and mouse functions at the same time and reducing input errors.

The present invention also provides a touch keypad in which a user's pressing strength is simply recognized without performing an additional mode converting operation so that a keypad mode and a mouse mode can be automatically converted in one device.

Technical Solution

According to an aspect of the present invention, there is provided a touch keypad including: an upper plate having a flat plate shape; a touch sensor formed on an upper side of the upper plate; a lower plate disposed to be spaced on a lower side of the upper plate; a connection member connecting the upper plate to the lower plate and supporting the upper plate so that the upper plate ascends and descends; a position sensor for detecting whether the upper plate ascends or descends; and a control unit for selecting a keypad mode or mouse mode according to a detected value of the position sensor.

The connection member may include: first and second upper links attached to the lower side of the upper plate to be spaced apart from each other; first and second lower links attached to the upper side of the lower plate to be spaced apart from each other; a first connection link part having both ends connected to the first upper link and the first lower link, respectively; and a second connection link part having both ends connected to the second upper link and the second lower link, respectively.

The first connection link part may include a $(1-1)^{th}$ connection link having both ends connected to one end of the first upper link and one end of the first lower link, respectively, and a $(1-2)^{th}$ connection link having both ends connected to the other end of the first upper link and the other end of the first lower link, respectively, and the second connection link part may include a $(2-1)^{th}$ connection link having both ends connected to one end of the second upper link and one end of the second lower link, respectively, and a $(2-2)^{th}$ connection link having both ends connected to the other end of the second upper link and the other end of the second lower link, respectively.

The connection member may further include a stopper formed on the first lower link and disposed on one side of the $(1-1)^{th}$ connection link to prevent the $(1-1)^{th}$ connection link from being rotated by a predetermined angle or more and may further include a left/right connection link having one end connected to the first upper link and the first lower link and the other end connected to the second upper link and the second lower link.

The touch keypad may further include a restoration member restoring the upper plate to its original position when the upper plate is moved downwards. The restoration member may include: a vertical frame uprightly mounted on an upper side of the lower plate; a horizontal frame pivotably coupled to the vertical frame and having one end contacting the lower side of the upper plate; a first magnet mounted on one of the horizontal frame and generating an attractive force with respect to the lower plate; a second magnet mounted on the other end of the horizontal frame; and a third magnet disposed on a lower side of the second magnet to generate a repulsive force together with the second magnet.

The restoration member may include: a vertical frame uprightly mounted on the upper side of the lower plate; a horizontal frame pivotably coupled to the vertical frame and having one end contacting the lower side of the upper plate; and a weight member mounted on an upper part of the horizontal frame and increasing a restoration force.

When the position sensor determines that the upper plate is moved downwards, the control unit may recognize a keypad mode and determine input text data based on a touch coordinate.

Advantageous Effects of the Invention

A touch keypad according to the present invention has the following effects.

Firstly, the touch keypad can be used for various uses such as a keypad and a mouse by using hardware through which one touch input is enabled.

Secondly, the vertical movement of an upper plate is detected. Thus, the touch keypad can be selectively used in a keypad mode or mouse mode to reduce the occurrence of input errors.

Thirdly, the upper plate can uniformly ascend or descend regardless of the position thereof as it is pressed by a connection member so as to prevent a device from being twisted.

DESCRIPTION OF THE DRAWINGS

FIG. 1 is a perspective view of a touch keypad according to an embodiment of the present invention.

FIG. 2 is an exploded perspective view of the touch keypad according to an embodiment of the present invention.

FIG. 3 is an enlarged view of a configuration of a connection member illustrated in FIG. 2.

FIG. 4 is an enlarged view of a configuration of combination of first upper and lower links and a $(1-2)^{th}$ connection link illustrated in FIG. 3.

FIG. 5 is an enlarged view of a restoration member illustrated in FIG. 2.

BEST MODE

Hereinafter, exemplary embodiments of the present invention will be described in detail with reference to the accompanying drawings. The terms or words used in the present specification and claims do not have to be interpreted to be limited in a general or dictionary sense but have to be interpreted in a sense and concept that complies with the technical spirit of the present invention based on a principle that the inventor can define the concept of the terms properly so as to describe his/her own invention in a best manner.

Referring to FIGS. 1 through 5, a touch keypad 100 according to an embodiment of the present invention includes an upper plate 110, a lower plate 120, a connection member 130, a position sensor 140, and a control unit 150.

The upper plate 110 has a plate shape with a flat top surface, and a touch sensor 111 is formed on the top surface of the upper plate 110. An indium tin oxide (ITO) electrode that is a transparent electrode or an opaque electrode may be used for the touch sensor 111 that is a touch sensor for detecting a position, such as a user's finger. Keyboard arrangement may be displayed on a top surface of the touch sensor 111.

The lower plate 120 is disposed on a lower side of the upper plate 110 to be spaced apart from the upper plate 110. The lower plate 120 is formed to have a size corresponding to the upper plate 110, and preferably, the lower plate 120 has a flat plate shape.

The upper plate 110 and the lower plate 120 are connected to each other by the connection member 130. The connection member 130 supports the upper plate 110 so that the upper plate 110 ascends or descends. The connection member 130 includes first and second upper links 131 and 136, first and second lower links 132 and 137, a first connection link 133, a second connection link 138, and a left/right connection link 139.

The first and second upper links 131 and 136 are fixed to the lower side of the upper plate 110 to be spaced apart from each other. The first and second upper links 131 and 136 each have a rectangular bar shape, and top surfaces thereof are fixed to the lower side of the upper plate 110.

The first and second lower links 132 and 137 are attached to an upper side of the lower plate 120 to be spaced apart from each other and each have a rectangular bar shape. The first and second lower links 132 and 137 are disposed to correspond to lower sides of the first and second upper links 131 and 136.

The first connection link 133 that connects the first upper link 131 and the first lower link 132 includes a $(1-1)^{th}$ connection link 133a and a $(1-2)^{th}$ connection link 133b. The $(1-1)^{th}$ connection link 133a has a bar shape, and top and bottom ends of the $(1-1)^{th}$ connection link 133a are pivotably hinge-coupled to one end of the first upper link 131 and one end of the first lower link 132, respectively. Also, the $(1-2)^{th}$ connection link 133b has a bar shape, and top and bottom ends of the $(1-2)^{th}$ connection link 133b are pivotably hinge-coupled to the other end of the first upper link 131 and the other end of the first lower link 132, respectively.

The second connection link 138 that connects the second upper link and the second lower link includes a $(2-1)^{th}$ connection link 138a and a $(2-2)^{th}$ connection link 138b. The $(2-1)^{th}$ connection link 138a has a bar shape, and top and bottom ends of the $(2-1)^{th}$ connection link 138a are pivotably hinge-coupled to one end of the second upper link 136 and one end of the second lower link 137, respectively. Also, the $(2-2)^{th}$ connection link 138b has a bar shape, and top and bottom ends of the $(2-2)^{th}$ connection link 138b are pivotably hinge-coupled to the other end of the second upper link 136 and the other end of the second lower link 137, respectively.

The first and second upper and lower links 131, 132, 136, and 137 and the first and second connection links 133 and 138 are connected to one another through mutual link connection, and the upper plate 110 coupled to top surfaces of the first and second upper links 131 and 136 ascends stably with respect to the lower plate 120 coupled to bottom surfaces of the first and second lower links 132 and 137.

Meanwhile, a stopper 132a is formed on the first lower link 132. The stopper 132a is disposed below the first upper link 131, and when the upper plate descends and the $(1-2)^{th}$ connection link 133b is rotated clockwise by a predetermined angle or more, the stopper 132a supports the other end of the first upper link 131 to prevent the $(1-2)^{th}$ connection link 133b from being rotated by a predetermined angle or more. The stopper 132a can also be installed on the second lower link 137.

Also, a stoppage part 135 is formed on one end of the $(1-2)^{th}$ connection link 133b and extends outwardly. When the upper plate 110 ascends and the $(1-2)^{th}$ connection link 133b is rotated counterclockwise by a predetermined angle or more, the stoppage part 135 comes into contact with the other end of the first lower link 132 to prevent the $(1-2)^{th}$ connection link 133b from being rotated by a predetermined angle or more.

The left/right connection link 139 is installed between the first upper and lower links 131 and 132 and the second upper and lower links 136 and 137. One end of the left/right connection link 139 is connected to the first upper link 131 and the first lower link 132, and the other end of the left/right connection link 139 is connected to the second upper link 136 and the second lower link 137 so that the first and second upper and lower links 131 and 136 are prevented from being twisted to the left/right and the upper plate 110 is prevented from being twisted. Thus, even when the user presses any part of the upper plate 110, the first and second upper and lower links 131 and 132 and 136 and 137 are not twisted with respect to one another.

Meanwhile, when the upper plate 110 is moved downwards, the restoration member 160 for restoring the upper plate 110 upwards is formed on the lower side of the upper plate 110.

Referring to FIG. 5, the restoration member 160 includes a vertical frame 161, a horizontal frame 162, a first magnet 163, a second magnet 164, and a third magnet 165 ad may further include a weight member 166.

The vertical frame 161 is placed uprightly on the upper side of the lower plate 120, and a hinge shaft 161a is pivotably coupled to an upper part of the vertical frame 161. The horizontal frame 162 is coupled to the hinge shaft 161a and is pivotably coupled to the vertical frame 161.

A pair of rollers 162a are mounted on one end of the horizontal frame, and the pair of rollers 162a are disposed to come into contact with the lower side of the upper plate 110. The first magnet 163 is mounted on one end of the horizontal frame 162, and the second magnet 164 is mounted on the other end of the horizontal frame.

Meanwhile, the third magnet 165 is disposed on the upper side of the lower plate 120 in a position corresponding to the position of the second magnet 164. The first magnet 163 generates an attractive force with respect to the lower plate 120 formed of steel, and the second magnet 164 and the third magnet 165 have the same polarity and generate repulsive forces in opposite directions.

The restoration member 160 may include the vertical frame 161, the horizontal frame 162, the first magnet 163, the second magnet 164, and the third magnet 165. However, embodiments of the present invention are not limited thereto. The weight member 166 may be disposed on an upper part of one end of the horizontal frame 162 having a lower part on which the first magnet 163 is mounted. When the other end of the horizontal frame 162 is moved downwards, one end of the horizontal frame 162 on which the weight member 166 is mounted, is rotated around the hinge shaft 161a and is moved upwards. In this case, the weight member 166 presses one end of the frame downwards by its weight so that the other end of the horizontal frame 162 is moved upwards and thus the upper plate 110 provided on the upper part of the horizontal frame 162 is restored to its original state. Due to a load of the weight member 166, a part of a load of the upper plate is offset so that a restoration force is increased. When the load of the weight member 166 is increased, the upper plate 110 is quickly returned to its original state, and when the load of the weight member 166 is decreased, the upper plate 110 is slowly returned to its original state by the reduced load of the weight member 166. Thus, the load of the weight member is adjusted so that the restoration force can also be adjusted.

In FIG. 5, the restoration member 160 includes the vertical frame 161, the horizontal frame 162, the first magnet 163, the second magnet 164, the third magnet 165, and the weight member 166. However, embodiments of the present invention are not limited thereto. The restoration member 160 may include the vertical frame 161, the horizontal frame 162, the first magnet 163, the second magnet 164, and the third magnet 165 except for the weight member 166. Instead of the first magnet 163, the second magnet 164, and the third magnet 165, the restoration member 160 may include the vertical frame 161, the horizontal frame 162, and the weight member 166. Preferably, if necessary, the restoration member 160 is selected and used.

Meanwhile, the position sensor 140 for detecting whether the upper plate 110 descends, is mounted on the upper side of the lower plate 120. A limit sensor, an optical sensor, and an electrostatic capacitive sensor, etc. may be used as the position sensor 140.

The position sensor 140 according to the current embodiment is formed as a contact sensor and detects whether the upper plate 110 comes into contact with the position sensor 140. When the user presses the upper plate 110 with his/her own finger at a predetermined pressure or more, the upper plate 110 is moved downwards and comes into contact with the position sensor 140. In the current embodiment, the contact sensor is used as the position sensor 140. However, of course, any different type of sensor for detecting descending movement of the upper plate 110 may also be used.

In this case, the position sensor 140 transmits a descending signal of the upper plate 110 to the control unit 150, and according to the mode, the control unit 150 recognizes a keypad mode according to the descending signal of the position sensor 140, determines a text input value according to the position detected by the touch sensor, and transmits the determined text input value to a computer.

Meanwhile, when the user has touched his/her own finger on the touch sensor but the upper plate 110 does not descend due to a pressing force less than a predetermined pressure, the position sensor 150 detects that there is no descending movement of the upper plate 110. Thus, the control unit 150 recognizes a mouse mode and transmits a simple position value detected by the touch sensor to the computer.

Hereinafter, an operating method of the touch keypad 100 according to an embodiment of the present invention will be described with reference to the attached drawings.

When the user uses the touch keypad 100 as a keypad for inputting a text, the user touches his/her own finger on the touch sensor 111 formed on the upper plate 110 and then presses the touch sensor 111. According to a pressing force, the upper plate 110 is moved downwards, and the position sensor 150 detects downward movement of the upper plate 110 and transmits a descending signal to the control unit 150. The control unit 150 determines a keypad mode based on the descending signal, determines a text signal corresponding to the finger contact position, and transmits the determined text signal to the computer.

Meanwhile, when the user uses the touch keypad as a mouse, the user touches his/her own finger lightly on the touch sensor 111 formed on the upper plate 110, in this state, moves the finger to do a work. In this case, the upper plate 110 is not moved downwards, and the position sensor 140 is maintained in an off state. Thus, the control unit 150 recognizes a mouse mode and transmits a simple position value detected by the touch sensor to the computer.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

The present invention can be used in a mouse and a keypad.

The invention claimed is:

1. A touch keypad comprising:
    an upper plate having a flat plate shape;
    a touch sensor formed on an upper side of the upper plate;
    a lower plate disposed to be spaced on a lower side of the upper plate;
    a connection member connecting the upper plate to the lower plate and supporting the upper plate so that the upper plate ascends and descends;
    a position sensor configured to detect downward movement of the upper plate, and to generate a descending signal;
    a control unit configured to select a keypad mode when receiving the descending signal, or to select a mouse mode; and
    a restoration member configured to restore the upper plate to its original position, wherein the restoration member comprises:
        a vertical frame uprightly mounted on an upper side of the lower plate;
        a horizontal frame pivotably coupled to the vertical frame, the horizontal frame including a first end contacting the lower side of the upper plate and a second end such that when the upper plate descends, the first end moves downwards and the second end move upwards; and
        a weight member mounted on the second end and pressing the second end downwards by its weight.

2. The touch keypad of claim 1, wherein the connection member comprises:
    first and second upper links attached to the lower side of the upper plate to be spaced apart from each other;
    first and second lower links attached to the upper side of the lower plate to be spaced apart from each other;
    a first connection link part having both ends connected to the first upper link and the first lower link, respectively; and
    a second connection link part having both ends connected to the second upper link and the second lower link, respectively.

3. The touch keypad of claim 2, wherein the first connection link part
    comprises a $(1\text{-}1)^{th}$ connection link having both ends connected to one end of the first upper link and one end of the first lower link, respectively, and a $(1\text{-}2)^{th}$ connection link having both ends connected to the other end of the first upper link and the other end of the first lower link, respectively, and
    the second connection link part comprises a $(2\text{-}1)^{th}$ connection link having both ends connected to one end of the second upper link and one end of the second lower link, respectively, and a $(2\text{-}2)^{th}$ connection link having both ends connected to the other end of the second upper link and the other end of the second lower link, respectively.

4. The touch keypad of claim 3, further comprising a stopper formed on the first lower link and disposed on one side of the $(1\text{-}1)^{th}$ connection link to prevent the $(1\text{-}1)^{th}$ connection link from being rotated by a predetermined angle or more.

5. The touch keypad of claim 2, wherein further comprising a left/right connection link having one end connected to the first upper link and the first lower link and the other end connected to the second upper link and the second lower link.

6. The touch keypad of claim 1, wherein the restoration member further comprises:
    a first magnet mounted on the second end and generating an attractive force with respect to the lower plate;
    a second magnet mounted on the first end; and
    a third magnet disposed on a lower side of the second magnet to generate a repulsive force together with the second magnet.

7. The touch keypad of claim 1, wherein, when the position sensor determines that the upper plate is moved downwards, the control unit recognizes a keypad mode and determines input text data based on a touch coordinate.

* * * * *